United States Patent
Kodali et al.

(10) Patent No.: US 9,307,569 B2
(45) Date of Patent: Apr. 5, 2016

(54) ADJUSTING CONNECTION STATES OF A MOBILE WIRELESS DEVICE BASED ON A PERIOD OF INACTIVITY

(71) Applicant: Apple Inc., Cupertino, CA (US)

(72) Inventors: Sree Ram Kodali, Cupertino, CA (US);
Dhanu Agnihotri, Cupertino, CA (US);
Amit K. Vyas, San Jose, CA (US);
Longda Xing, San Jose, CA (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 13/903,801

(22) Filed: May 28, 2013

(65) Prior Publication Data

US 2013/0329637 A1    Dec. 12, 2013

Related U.S. Application Data

(60) Provisional application No. 61/657,734, filed on Jun. 8, 2012.

(51) Int. Cl.
*H04W 76/04* (2009.01)
*H04W 76/06* (2009.01)

(52) U.S. Cl.
CPC .......... *H04W 76/046* (2013.01); *H04W 76/048* (2013.01); *H04W 76/068* (2013.01); *Y02B 60/50* (2013.01)

(58) Field of Classification Search
CPC ..... H04W 76/00; H04W 76/04; H04W 52/02; H04W 24/00; H04W 52/04; H04W 76/046; G06F 1/32
USPC ......... 370/231, 235, 241, 252, 280, 311, 328, 370/329, 331, 338; 455/418, 422.1, 450, 455/509; 709/224; 713/320; 719/318
See application file for complete search history.

(56) References Cited

U.S. PATENT DOCUMENTS

| | | | |
|---|---|---|---|
| 7,949,377 B2 | 5/2011 | Islam et al. | |
| 7,969,924 B2 | 6/2011 | Young et al. | |
| 2009/0217065 A1* | 8/2009 | Araujo, Jr. | 713/320 |
| 2011/0222451 A1 | 9/2011 | Peisa et al. | |
| 2011/0319064 A1* | 12/2011 | Lenart et al. | 455/418 |
| 2012/0113905 A1 | 5/2012 | Anderson et al. | |
| 2012/0120815 A1 | 5/2012 | Anderson et al. | |
| 2012/0120934 A1* | 5/2012 | Cho | 370/338 |
| 2012/0281561 A1* | 11/2012 | Shukla et al. | 370/252 |
| 2013/0003577 A1 | 1/2013 | Gupta et al. | |
| 2013/0029651 A1* | 1/2013 | Martin et al. | 455/418 |
| 2013/0260810 A1* | 10/2013 | Rayavarapu | 455/509 |

\* cited by examiner

*Primary Examiner* — Charles C Jiang
*Assistant Examiner* — Wali Butt
(74) *Attorney, Agent, or Firm* — Downey Brand LLP

(57) ABSTRACT

Methods, apparatuses and computer readable media are described that adjust radio resource control connection states between a mobile wireless device and a wireless network following determination that a set of inactivity trigger conditions is met. Time periods between successive data messages and/or signaling messages transmitted to and/or received from a wireless access network are measured. When a prolonged period of data inactivity and/or signaling activity is determined, the mobile wireless device re-establishes an existing radio resource control connection to the wireless access network or releases the radio resource control connection to the wireless access network and transitions to an idle state.

19 Claims, 8 Drawing Sheets

ADJUSTING CONNECTION STATES OF A MOBILE WIRELESS DEVICE BASED ON A PERIOD OF INACTIVITY

CROSS-REFERENCE TO RELATED APPLICATIONS

This application claims the benefit of U.S. Provisional Application No. 61/657,734, filed Jun. 8, 2012 and entitled "MOVE TO IDLE STATE IN LTE WHEN NO DATA ACTIVITY IS DETECTED FOR A TIME," which is incorporated by reference herein in its entirety for all purposes.

TECHNICAL FIELD

The described embodiments generally relate to methods and apparatuses for managing connections states between mobile wireless devices and wireless networks. More particularly, the present embodiments describe adjusting connection states between a mobile wireless device and a wireless network upon detection of a prolonged period of inactivity at the mobile wireless device.

BACKGROUND

Wireless networks continue to evolve as new communication technologies develop and standardize. Wireless network operators can deploy new communication technologies in parallel with earlier generation communication technologies, and wireless networks can support multiple communication technologies simultaneously to provide smooth transitions through multiple generations of mobile wireless devices. Mobile wireless devices can include hardware and software to support wireless connections to different types of wireless networks that use different wireless communication technologies. Representative wireless communication technologies include technologies deployed by wireless networks based on communication protocols codified by the Third Generation Partnership Project (3GPP) and the Third Generation Partnership Project 2 (3GPP2) standards bodies. Communication protocols include the 3GPP Universal Mobile Telecommunications System (UMTS) wireless communication protocol, the 3GPP Global System for Mobile Communications (GSM) wireless communication protocol, and the 3GPP Long Term Evolution (LTE) and LTE-Advanced wireless communication protocols. Communication protocols also include the 3GPP2 Code Division Multiple Access (CDMA) 2000 1x (also referred to as 1xRTT or 1x) wireless communication protocol. The teachings provided herein are described in terms of the 3GPP LTE and LTE-Advanced wireless communication protocols but can also apply to mobile wireless devices that operate using other wireless communication protocols.

In some wireless communication protocols, e.g., the 3GPP UMTS wireless communication protocol, a mobile wireless device can detect an extended period of inactivity while connected to a wireless access network. The mobile wireless device can transmit a request to the wireless access network to release a connection between the mobile wireless device and the wireless access network after detecting the extended inactivity period. The mobile wireless device, upon receipt of a response from the wireless access network, can transition from a higher power consumption connected state to a lower power consumption idle state, thereby conserving battery resources of the mobile wireless device. A representative embodiment of this power saving feature is known as "fast dormancy" for the UMTS wireless communication protocol.

The 3GPP LTE and LTE-Advanced wireless communication protocols do not include a mobile wireless device based feature equivalent to the "fast dormancy" provided in the UMTS wireless communication protocol. During an extended period of inactivity, while in a connected mode, the mobile wireless device can continue to consume power at a higher rate, even without any data transmission or reception by the mobile wireless device. Although the wireless access network can detect a period of inactivity and transmit a message to the mobile wireless device releasing a connection with the mobile wireless device, in certain circumstances, the mobile wireless device can miss receiving or not properly decode the connection release message transmitted by the wireless access network. The wireless access network, having sent the connection release message, can consider the mobile wireless device to be in an idle (not connected) state, while the mobile wireless device, having missed the connection release message, can remain in a connected state. In the absence of an inactivity timer at the mobile wireless device or a mechanism to request a transition to an idle state, the mobile wireless device can remain in the higher power connected state for a considerable length of time draining power from its battery. Thus, there exists a need to detect periods of inactivity at the mobile wireless device and adjust connection states of the mobile wireless device, e.g., to transition the mobile wireless device from a high power consumption connected state to a low power consumption idle state.

This application describes methods and apparatuses by which a mobile wireless device can adjust connection states between the mobile wireless device and a wireless network upon detection of a prolonged period of inactivity at the mobile wireless device.

SUMMARY OF THE DESCRIBED EMBODIMENTS

Broadly speaking, the described embodiments relate to methods and apparatuses for managing connections states between mobile wireless devices and wireless networks. More particularly, the present embodiments describe adjusting connection states between a mobile wireless device and a wireless network upon detection of a prolonged period of inactivity at the mobile wireless device.

In an embodiment, a method to adjust radio resource control (RRC) connections states of a mobile wireless device in communication with a wireless access network using a Long Term Evolution (LTE) or Long Term Evolution Advanced (LTE-A) wireless communication protocol is described. The method includes at least the following steps executed at the mobile wireless device, while the mobile wireless device is in an RRC connected state. The mobile wireless device measures continuous time periods between successive data messages transmitted to or received from the wireless access network. The mobile wireless device determines that all inactivity trigger conditions in a set of one or more inactivity trigger conditions are met. The set of inactivity trigger conditions includes a first continuous time period between successive data messages exceeds a data inactivity threshold at the mobile wireless device, without the mobile wireless device receiving an RRC connection release signaling message from the wireless access network during the first continuous time period. The mobile wireless device changes an internal state from the RRC connected state to an RRC idle state in response to all of the inactivity trigger conditions being met. In a representative embodiment, the method further includes the mobile wireless device measuring continuous time periods between successive signaling messages transmitted to or received from the wireless access network. The set of one or more inactivity trigger conditions further includes a second continuous time period between successive signaling messages exceeds a signaling inactivity threshold.

In another embodiment, a mobile wireless device is described. The mobile wireless device includes at least one or more processors, a transmitter and one or more receivers. The one or more processors are configured to control establishing and releasing RRC connections between the mobile wireless device and a wireless access network. The transmitter is configured to transmit signals to the wireless access network according to a LTE or LTE-A wireless communication protocol. The one or more receivers are configured to receive signals from the wireless access network according to the LTE or LTE-A wireless communication protocol. The one or more processors are further configured to measure continuous time periods between successive data messages transmitted to or received from the wireless access network. The one or more processors are configured to determine that all inactivity trigger conditions in a set of one or more inactivity trigger conditions are met. The set of one or more inactivity trigger conditions includes a first continuous time period between successive data messages exceeds a data inactivity threshold. The one or more processors are further configured to transition the mobile wireless device from an RRC connected state to an RRC idle state in response to all of the inactivity trigger conditions being met. In a representative embodiment, the one or more processors of the mobile wireless device are configured to transmit a signaling message to the wireless access network, the signaling message including a request to establish a new RRC connection with the wireless access network after the mobile wireless device transitions from the RRC connected state to the RRC idle state. In another representative embodiment, the one or more processors of the mobile wireless device are configured to transmit a signaling message to the wireless access network, the signaling message including a request to re-establish an existing RRC connection with the wireless access network before the mobile wireless device transitions from the RRC connected state to the RRC idle state, and to transition the mobile wireless device from the RRC connected state to the RRC idle state in response to receiving an RRC re-establishment reject message from the wireless access network.

In another embodiment, a computer program product encoded as computer program code in a non-transitory computer readable medium for adjusting RRC connections states at a mobile wireless device in communication with a wireless access network is described. The computer program product includes at least the following computer program code. Computer program code for measuring continuous time periods between successive data messages transmitted to or received from the wireless access network by the mobile wireless device. Computer program code for determining that all inactivity trigger conditions in a set of one or more inactivity trigger conditions are met. The set of one or more inactivity trigger conditions includes a first continuous time period between successive data messages that exceeds a data inactivity threshold. Computer program code for transitioning the mobile wireless device from an RRC connected state to an RRC idle state in response to all of the inactivity trigger conditions being met.

In representative embodiments, a battery power state of the mobile wireless device, an activity state of a display of the mobile wireless device, a tethering state of the mobile wireless device, or a combination of these is monitored at the mobile wireless device. In representative embodiments, the set of one or more inactivity trigger conditions further includes the mobile wireless device is not connected to an external power supply, the activity state of the display of the mobile wireless device is off, the mobile wireless device is not tethered by a wired connection to a computing device, or a combination of these.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1:
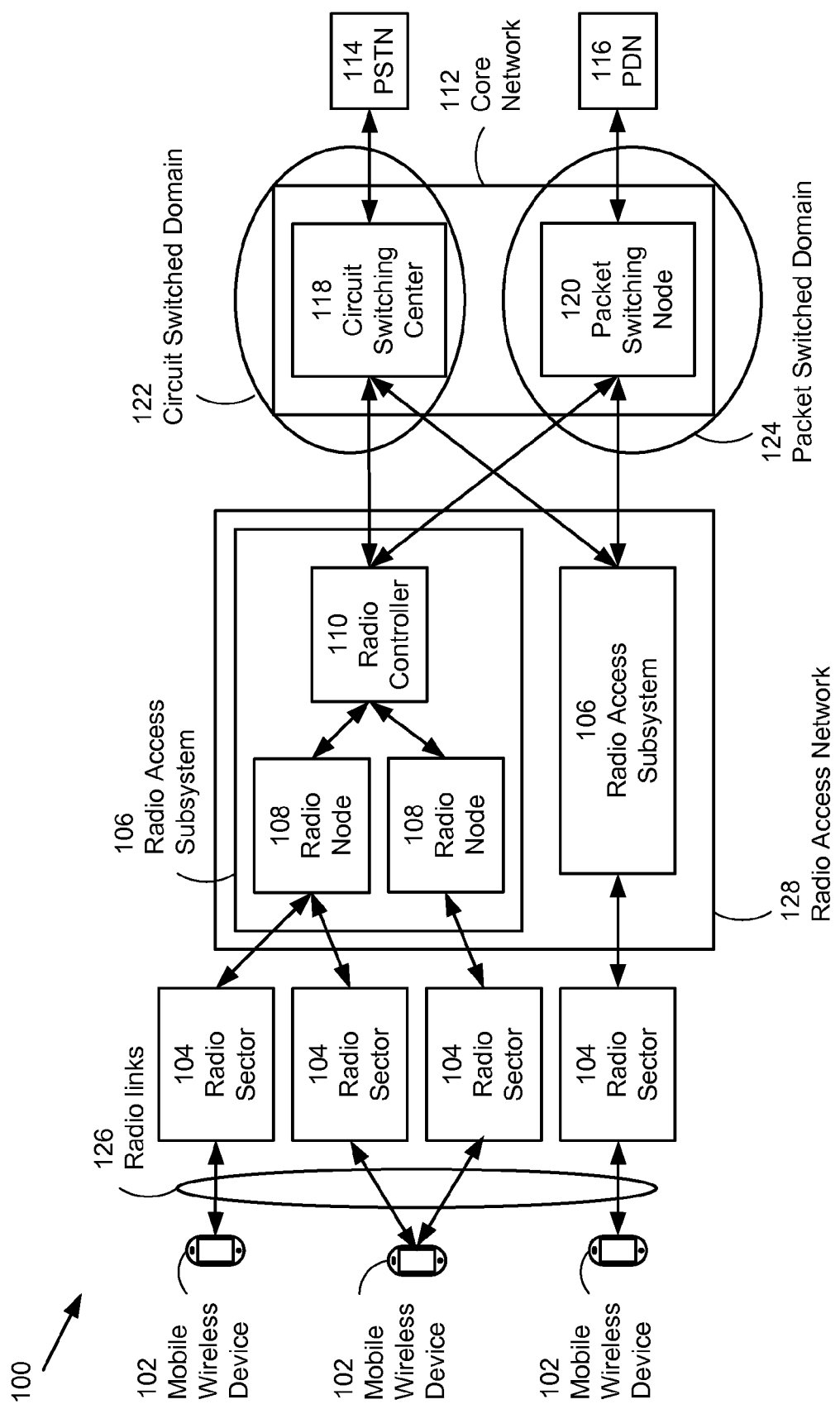
FIG. 1 illustrates components of a generic wireless communication network.

Wireless networks continue to evolve as network operators deploy equipment for new wireless communication technologies based on ongoing standardization efforts. Mobile wireless devices can provide capabilities to communicate with wireless networks based on different wireless communication technologies, as newer wireless network technologies offer advanced capabilities in parallel with earlier wireless network technologies that can provide greater geographic area coverage and/or varying wireless service implementations. Representative wireless communication technologies include technologies deployed by wireless networks based on communication protocols codified by the Third Generation Partnership Project (3GPP) and the Third Generation Partnership Project 2 (3GPP2) standards bodies. Communication protocols include the 3GPP Universal Mobile Telecommunications System (UMTS) wireless communication protocol, the 3GPP Global System for Mobile Communications (GSM) wireless communication protocol, and the 3GPP Long Term Evolution (LTE) and LTE-Advanced wireless communication protocols. Communication protocols also include the 3GPP2 Code Division Multiple Access (CDMA) 2000 1x (also referred to as 1xRTT or 1x) wireless communication protocol. The teachings provided herein are described in terms of the 3GPP LTE and LTE-Advanced wireless communication protocols but can also apply to mobile wireless devices that operate using other wireless communication protocols.

As wireless communication protocols have evolved to offer increased transmission speeds and other advanced features, manufacturers of mobile wireless devices have sought to manage power consumption effectively to maintain or extend the time required between battery charges. Advanced features can consume more power than less advanced features, and different connection states (or modes) can require substantially different amounts of battery power. When actively transmitting or receiving data, the mobile wireless device can consume the greatest amount of power, while in a "dormant" idle state, the mobile wireless device can consume the least amount of power. When not actively transmitting or receiving data, the mobile wireless device can listen periodically for data or paging messages from one or more communication networks, and in between listening power down select circuitry thereby consuming an intermediate amount of power. While actively listening for messages from the wireless communication network, the mobile wireless device can respond quickly (i.e., latency can be reduced); however, battery power can be unnecessarily consumed in the absence of any received or transmitted messages over an extended period of time. The 3GPP UMTS wireless communication protocol includes a feature referred to as "fast dormancy" that permits the mobile wireless device to release an active connection to the wireless communication network after an extended time period of data inactivity. The mobile wireless device can transition from a connected state, e.g., an RRC connected state, in which power consumption can be higher, to an idle state, e.g., an RRC idle state, in which power consumption can be lower, thereby conserving limited battery resources of the mobile wireless device. The 3GPP LTE (and LTE-Advanced) wireless communication protocol does not include the "fast dormancy" feature, in which the mobile wireless device requests to transition to a more power efficient state. Instead, the LTE wireless communication protocol relies on decisions by the wireless communication network to detect an extended period of data and/or signaling inactivity and to transition the mobile wireless device from an active connected state to an inactive (or minimally active) idle state.

In certain circumstances, the wireless communication network can seek to transition the mobile wireless device from a connected state to an idle state, e.g., by sending a radio resource control (RRC) connection release message to the mobile wireless device. In a noisy and/or interference dominated environment (and/or when the mobile wireless device receives signals having poor signal strength), the mobile wireless device can be unable to receive and/or decode properly the transmitted RRC connection release message. As a result, the mobile wireless device can remain in a connected state with the wireless communication network, while the wireless communication network can expect that the mobile wireless device has properly transitioned to an idle state. During a period of mismatched connection states, the mobile wireless device can continue to consume power unnecessarily while remaining in the connected state listening for messages from the wireless communication network. The LTE wireless communication protocol does not specify a periodic timer by which the mobile wireless device can check for an extended period of inactivity in order to transition the mobile wireless device from the more power consuming connected state to a more power efficient idle state. Thus, there exists a need to detect periods of inactivity at the mobile wireless device and independently transition the mobile wireless device from to more power efficient states without sending a signaling message to or awaiting a signaling message from the wireless access network as further described herein.

The mobile wireless device can determine that a set of one or more inactivity trigger conditions has been met and transition to a more power efficient state, e.g., to an idle state from a less power efficient state, e.g., from a connected state. In some embodiments, all inactivity trigger conditions in the set of one or more inactivity trigger conditions must be met. The mobile wireless device can monitor time periods between successive data messages and/or between signaling messages. In some embodiments, signaling messages for periodic measurement reports provided from the mobile wireless device to the wireless communication network can be excluded when measuring time periods between signaling messages. During a prolong time period between messages, the mobile wireless device can conclude that an existing connection, e.g., an RRC connection, to a wireless communication network is not functioning properly and can seek to correct the faulty connection, e.g., by transitioning the mobile wireless device from the connected state to an idle state (which can then permit establishing a new RRC connection) or by attempting to re-establish the RRC connection with the wireless communication network. The mobile wireless device can test for time periods between successive data messages and/or signaling messages against inactivity threshold values. The values for the inactivity thresholds can depend on whether the mobile wireless device supports and/or is configured to support a discontinuous reception (DRX) mode (or sub-state) while in an RRC connected state with the wireless communication network. The mobile wireless device can also test for whether the mobile wireless device is connected to an external power supply, whether the mobile wireless device is tethered through a wired connection to a computing device (through which in some embodiments power can be supplied from the computing device to the mobile wireless device), and/or whether a display screen of the mobile wireless device is active (e.g., indicating that a user may be interacting with the mobile wireless device). In some embodiments, the mobile wireless device can remain in a connected state when connected to an external power supply, when tethered to another device through a wired connection, and/or when a display screen of the mobile wireless device is "on." In the methods described herein, the mobile wireless device is not required to send a signaling message to the wireless communication network requesting to release an RRC connection. Instead, the mobile wireless device can release the RRC connection locally in the mobile wireless device, e.g., by changing an internal state of the mobile wireless device. In some embodiments, the mobile wireless communication device can attempt to re-establish the RRC connection to the wireless communication network before releasing the RRC connection to the wireless communication network. In some embodiments, following release of the RRC connection, the mobile wireless device can seek to establish a new RRC connection with the wireless communication network.

In the description provided herein, the term "data messages" can refer to data units transported at different layers of a communication protocol stack in the mobile wireless device (and at equivalent layers in communication protocol stacks of one or more network elements of a wireless network). A "data message" can include a protocol data unit, e.g., a "frame" at a data link layer, a "message" at a media access control (MAC) layer, a "packet" at a network layer, a "segment" at a TCP transport layer, a "datagram" at a UDP transport layer, or any other equivalent data unit exchanged between comparable layers of the mobile wireless device and network elements of the wireless network. Data messages can be exchanged across a "data plane" of a communication system. Similarly "signaling messages" can refer to data formatted into structured blocks and exchanged at one or more layers between the mobile wireless device and network elements of the wireless network. Signaling message can be exchanged across a control plane of a communication system.

FIG. 1 illustrates a representative generic wireless network 100 that can include multiple mobile wireless devices 102 connected by radio links 126 to radio sectors 104 provided by a radio access network 128. (Radio sectors 104 can also be referred to a radio cells, or simply cells, for some wireless communication technologies.) Each radio sector 104 can represent a geographic area of radio coverage emanating from an associated radio node 108 using a radio frequency channel operating at a selected frequency. Each radio node 108 can generate one or more radio sectors 104 to which the mobile wireless device 102 can connect by one or more radio links 126. In some wireless networks 100, the mobile wireless device 102 can be connected to more than one radio sector 104 simultaneously. The multiple radio sectors 104 to which the mobile wireless device 102 can be connected can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128.

Paging messages can be used to establish connections between the mobile wireless device 102 and the radio access network 128, e.g., a paging message from the radio access network 128 to the mobile wireless device 102 can cause the mobile wireless device 102 to send a connection request message to the radio access network 128 to transition the mobile wireless device 102 from an idle state to a connected state. While in the connected state, the mobile wireless device 102 can exchange data messages over one or more data radio access bearers established between the mobile wireless device 102 and the radio access network 128. The mobile wireless device 102 can also exchange signaling messages over one or more signaling radio access bearers established between the mobile wireless device 102 and the radio access network 102. The radio access network 128 can include one or more inactivity timers that determine when the radio access network 128 elects to terminate a connection with the mobile wireless device 102. The radio access network 128 can transmit a signaling message to the mobile wireless device 102 to release a connection that has been established with the mobile wireless device 102. For certain wireless communication protocols, the mobile wireless device 102 can also include one or more local inactivity timers that can indicate when to terminate an established connection with the radio access network 128. For some wireless communication protocols, the mobile wireless device 102 cannot send a signaling message to terminate an established connection with the radio access network 128. The mobile wireless device 128 can instead rely on receiving a signaling message from the radio access network 128 to indicate termination of an existing connection to the radio access network 128. If a signaling message intended to terminate a connection between the radio access network 128 and the mobile wireless device 102 is lost or corrupted (and therefore not properly received and/or decoded by the mobile wireless device 102), the mobile wireless device 102 can inadvertently maintain the connection to the radio access network 128 for an extended time period. As an active connection can consume more battery power than an inactive idle state, the mobile wireless device 102 can unnecessarily drain battery resources while remaining in a connected state rather than in an idle state during an extended period of data or signaling inactivity.

Radio resources that form the radio links 126 in the radio sectors 104 can be shared among multiple mobile wireless devices 102 using a number of different multiplexing techniques, including time division, frequency division, code division, space division and combinations thereof. A radio resource control (RRC) signaling connection can be used to communicate between the mobile wireless device 102 and the radio controller 110 in the radio access subsystem 106 of the radio access network 128 including requests for and dynamic allocations of radio resources to multiple mobile wireless devices 102. Suspension of allocation of radio resources to a mobile wireless device 102 can occur without dis-establishing the radio resource signaling connection to the mobile wireless device 102.

The radio access network 128, which provides radio frequency air link connections to the mobile wireless device 102, also connects to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
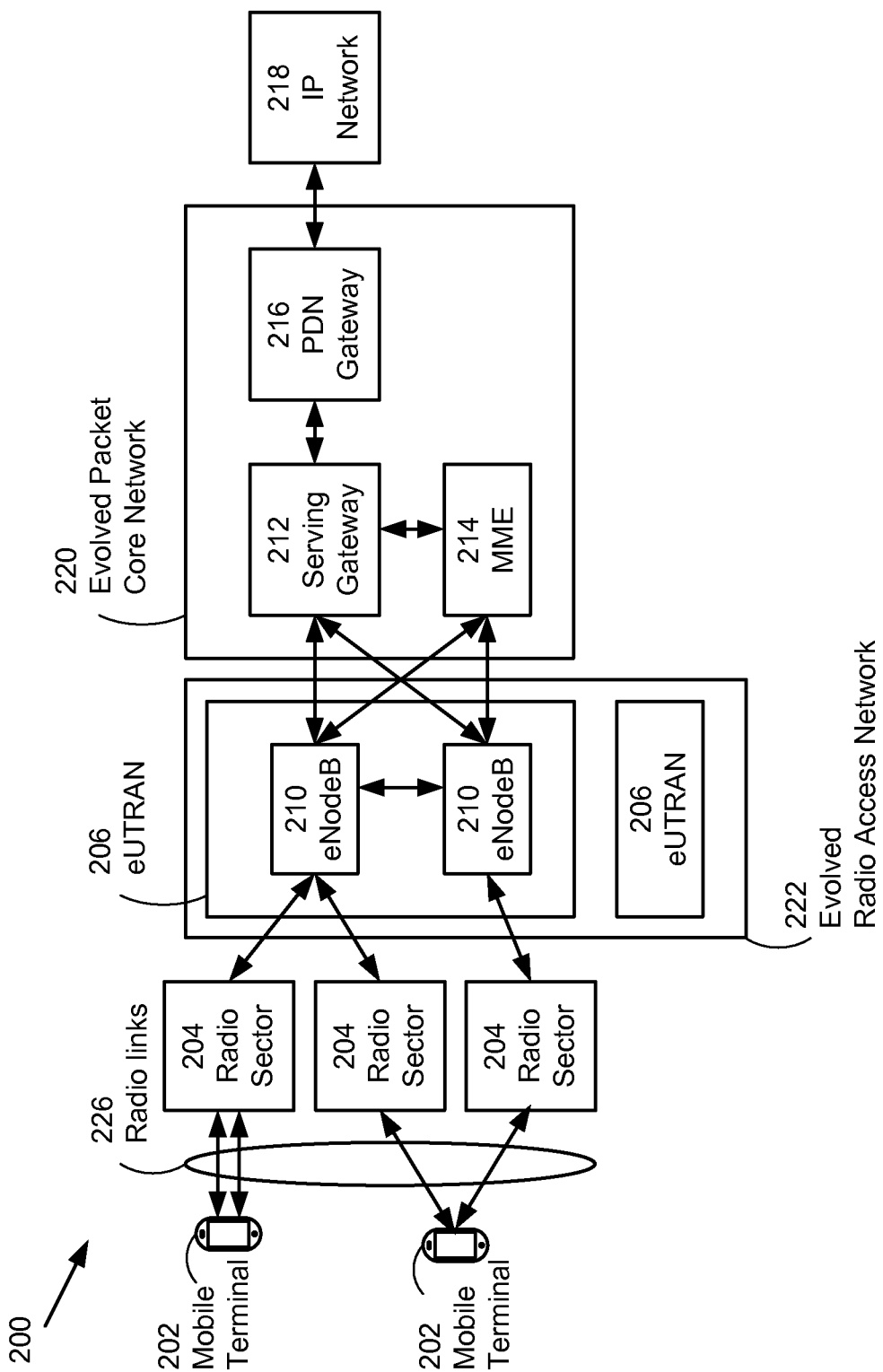
FIG. 2 illustrates components of an LTE (or LTE-Advanced) wireless communication network.

FIG. 2 illustrates a representative Long Term Evolution (LTE) wireless network 200 that is designed to function as a packet switched network exclusively. A mobile terminal 202 can connect to an evolved radio access network 222 through radio links 226 associated with radio sectors 204 that emanate from evolved Node B's (eNodeB) 210. (In some embodiments, the mobile terminal 202 can also be referred to as user equipment (UE) or more generically as a mobile wireless device as described for FIG. 1.) The eNodeB 210 in FIG. 2 includes the functions of both transmitting and receiving base stations (such as provided by radio nodes 108 in the radio access subsystem 106 of FIG. 1) as well as base station radio controllers (such as provided by the radio controller 110 in the radio access subsystem 106 of FIG. 1). An equivalent "core network" of the LTE wireless network 200 is an evolved packet core network 220 including serving gateways 212 that interconnect the evolved radio access network 222 to public data network (PDN) gateways 216 that connect to external internet protocol (IP) networks 218. Multiple eNodeB's 210 can be grouped together to form an evolved UMTS radio access network (eUTRAN) 206. The eNodeB 210 can also be connected to a mobility management entity (MME) 214 that can provide control over connections for the mobile terminal 202. The eNodeB 210 can control allocation of radio resources for the radio links 226 to the mobile terminals 202.

The eNodeB 210 can communicate paging messages to the mobile terminals 202, including paging messages to establish an RRC connection with the mobile terminal 202 and to transition the mobile terminal 202 from an RRC idle state to an RRC connected state. The mobile terminal 202 can be required to be in an RRC connected state in order to communicate application data messages and signaling messages with the eUTRAN 206 of the evolved radio access network 222. An RRC connection establishment procedure can start with the mobile terminal 202 sending an RRC connection request message to the eNodeB 210. When the LTE network 200 seeks to establish an RRC connection with the mobile terminal 202, the eNodeB 210 can send a paging message to the mobile terminal 202. The mobile terminal 202 in turn can respond to the paging message by initiating an RRC connection establishment procedure. During an extended period of data inactivity, the eNodeB 210 can communicate an RRC connection release message to the mobile terminal 202. (Note the term mobile wireless device 102 shall be used generically hereinafter to refer to the mobile terminal 202 or an equivalent device that can connect to a wireless communication network, including the LTE wireless network 200.)

Figure 3:
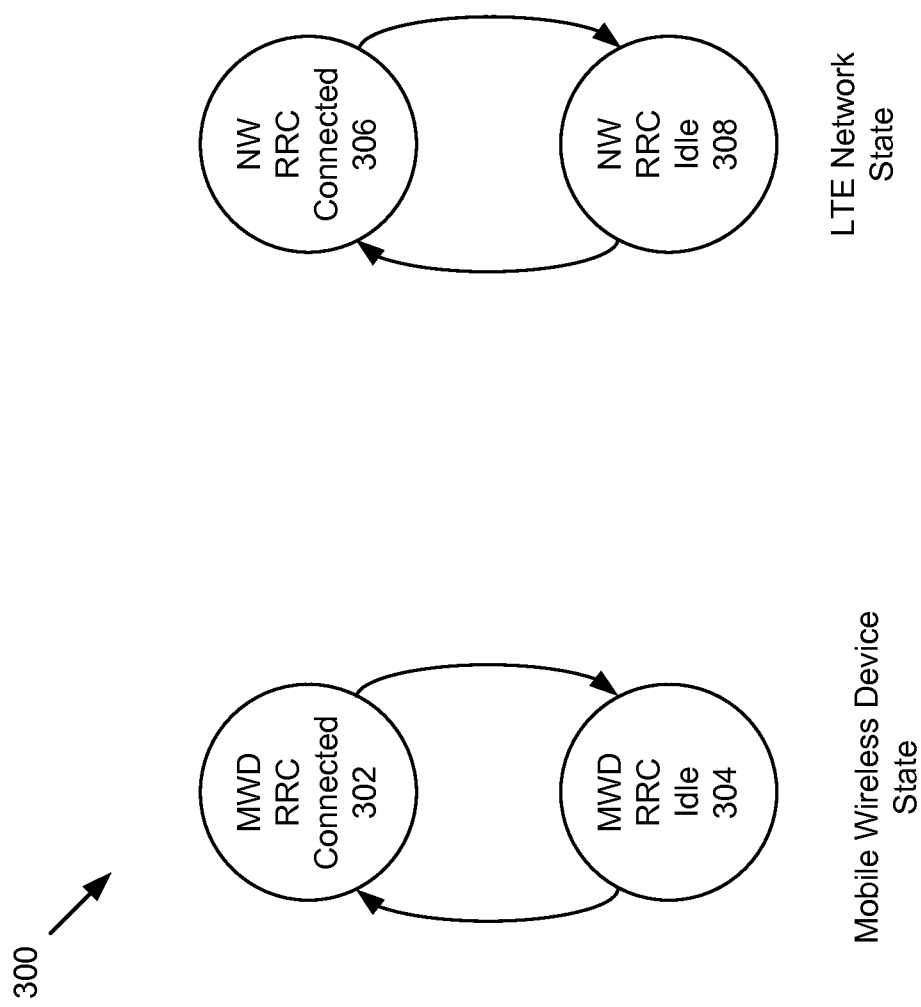
FIG. 3 illustrates radio resource control (RRC) connection states for a mobile wireless device and a wireless access network.

FIG. 3 illustrates a state diagram 300 for radio resource control (RRC) connection states of a mobile wireless device 102 and of a wireless network, e.g., the LTE wireless network 200 (or an eUTRAN 206 or an eNodeB 210 contained therein). (The connection states illustrated in FIG. 3 can refer to a connection between the LTE wireless network 200 and a particular mobile wireless device 102.) The mobile wireless device 102 can be in an RRC connected state 302 or an RRC idle state 304. Similarly the LTE wireless network 200 can be in an RRC connected state 306 or an RRC idle state 308. (The connection state of the LTE wireless network 200 can refer to how the LTE wireless network 200 perceives a connection to the particular mobile wireless device 102.) An RRC connection establishment procedure can be used to transition the mobile wireless device 102 and the LTE wireless network 200 from an RRC idle state 304/308 to an RRC connected state 302/306. When the RRC connection state of the LTE wireless network 200 does not match the RRC connection state of the mobile wireless device 102, a connection state misalignment, or equivalently a connection state synchronization failure, can occur. The connection state misalignment can occur when an extended signal fade occurs between the mobile wireless device 102 and the LTE wireless network 200 interrupting communication between the LTE wireless network 200 and the mobile wireless device 102. The eNodeB 210 can release the RRC connection with the mobile wireless device 102 by sending an RRC connection release message to the mobile wireless device 102, which can be not received properly by the mobile wireless device 102, resulting in a misaligned RRC connection state between the mobile wireless device 102 and the eNodeB 210 of the LTE wireless network 200. The LTE wireless network 200 can assume the mobile wireless device 102 is in the RRC idle state 304 after transmitting the RRC connection release message to the mobile wireless device 102. The mobile wireless device 102, however, can remain in the RRC connected state 302 (having missed the RRC connection release message from the LTE wireless network 200) and can continue to consume battery power awaiting data messages and/or signaling messages from the LTE wireless network 200.

Figure 4:
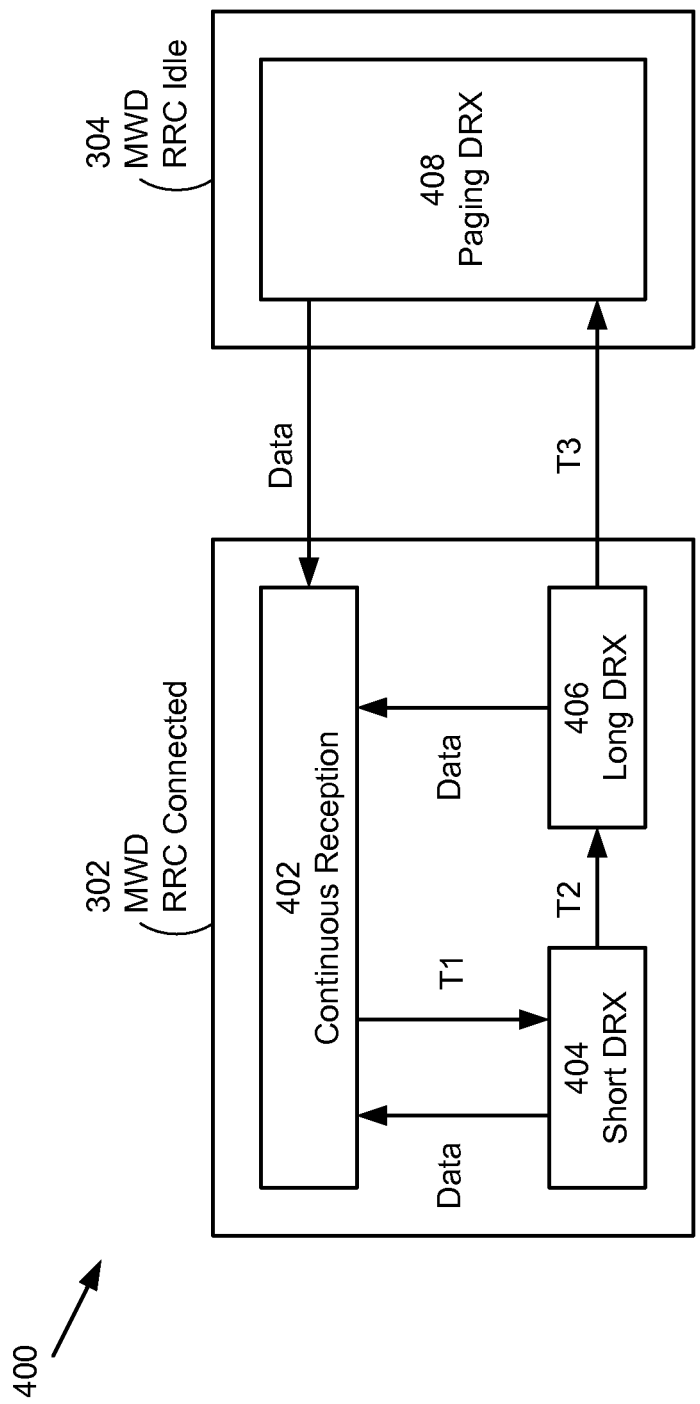
FIG. 4 illustrates sub-states for the RRC connection states of a mobile wireless device illustrated in FIG. 3.

FIG. 4 illustrates multiple connection sub-states 400 for connection states of the mobile wireless device 102, including connection sub-states for the RRC connected state 302 of the mobile wireless device 102 and for the RRC idle state 304 of the mobile wireless device 102. In each of the connection sub-states, the mobile wireless device 102 can consume a different amount of power. In the RRC connected state 302, the mobile wireless device 102 can consume the greatest amount of power while actively transmitting and receiving data and/or signaling messages. This highest power state can be represented by the continuous reception 402 sub-state of the RRC connected state 302. While in the continuous reception 402 sub-state, the mobile wireless device 102 can activate one or more radio frequency signaling chains in order to transmit messages to a wireless access network and/or to listen for messages from the wireless access network. The mobile wireless device 102 can include an inactivity timer (or other monitoring mechanism) that can determine when to transition the mobile wireless device 102 from the continuous reception 402 sub-state to a lower power discontinuous reception (DRX) sub-state (or equivalently referred to as a DRX state, or DRX mode). In some embodiments, the inactivity timer can be referred to as a DRX inactivity timer, and a value for the length of time for expiration of the DRX inactivity timer can be set by the wireless access network. In some embodiments, the range of values for the DRX inactivity timer can vary between milliseconds and a few seconds. In a discontinuous reception sub-state, the mobile wireless device 102 can oscillate between an "on" state in which the mobile wireless device listens for messages from the wireless access network and an "off" state in which circuitry, e.g., a transmitter and/or one or more receivers and/or signal processing elements, can be disabled, powered down, reduced in clock frequency (or other equivalent power saving measures applied) in order to conserve battery power while in the "off" state. The wireless access network or a network element contained therein, e.g., the eNodeB 210 of the EUTRAN 206 of the LTE wireless network 200, can schedule to transmit signaling messages to the mobile wireless device 102 during the "on" periods of the DRX cycles.

As shown in FIG. 4, the RRC connected state 302 can include two DRX sub-states, a short DRX sub-state 404 and a long DRX sub-state 406. In each of the two DRX sub-states, the mobile wireless device 102 can periodically wake up and listen for messages from the wireless access network. In the short DRX sub-state 404 the time period between "on" segments can be shorter than in the long DRX sub-state 406. Thus the short DRX sub-state 404 can consume, on average, a larger amount of power than the long DRX sub-state 406. The mobile wireless device 102 can transition to the short DRX sub-state 404 from the continuous reception sub-state 402 after a period of inactivity the length of which (T1) can be specified by the eNodeB 210 of the wireless access network. The mobile wireless device 102 can return to the continuous reception sub-state 402 from the short DRX sub-state 404 in response to signaling messages received from the wireless access network or when there exists uplink packet data to transmit to the wireless access network queued up in the mobile wireless device 102. After an additional inactivity time period, indicated by the length T2, the mobile wireless device 102 can transition from the short DRX sub-state 404 to the long DRX sub-state 406. The short DRX sub-state 404 can provide for a shorter time latency to respond to signaling messages from the wireless access network than the long DRX sub-state 406, but the mobile wireless device 102 can also consume more power in the short DRX sub-state 404 than in the long DRX sub-state 406. The long DRX sub-state 406 can provide a trade off between additional latency to respond to signaling messages and lower power consumption. The mobile wireless device 102 can return directly to the continuous reception sub-state 402 from the long DRX sub-state 406 when uplink data is available to transmit or in response to signaling messages received from the wireless access network. The wireless access network can set the values for T1 and T2; however, the timers to implement the transitions between the sub-states 402/404/406 of the RRC connected state 302 can exist in the mobile wireless device 102.

To transition from the RRC connected state 302 to the RRC idle state 304, however, the mobile wireless device 102 can await to receive an a RRC connection release signaling message from the wireless access network. The RRC idle state 304 can include a sub-state referred to as a "paging" DRX sub-state 408 in which the mobile wireless device 102 listens for paging messages from the wireless access network at regular intervals and sleeps in between to conserve battery power. The time between listening periods in the paging DRX sub-state 408 can be longer than in the long DRX sub-state 406 of the connected state 302. When the mobile wireless device 102 has no data to transmit and no data is received for an extended period of time, the idle state 304 can provide the most power efficient mode in which to operate the mobile wireless device 102. Thus, it can be desired to transition the mobile wireless device 102 to the idle state 304 directly by the mobile wireless device 102 in the absence of any data messages and/or signaling messages transmitted to or received from the wireless access network for a prolonged time period. While in the idle state 304, the mobile wireless device 102 can remain registered with the LTE wireless network 200, e.g., with the mobility management entity (MME) 214 of the LTE wireless network 200. The mobile wireless device 102 can be paged to indicate incoming downlink data messages from the LTE wireless network 200. The mobile wireless device 102 can also request an RRC connection to return to the RRC connected state 302 in order to transmit uplink data to the LTE wireless network 200. The mobile wireless device 102 can also perform network selection, cell selection, cell re-selection, and location registration updates while in the RRC idle state 304.

Figure 5:
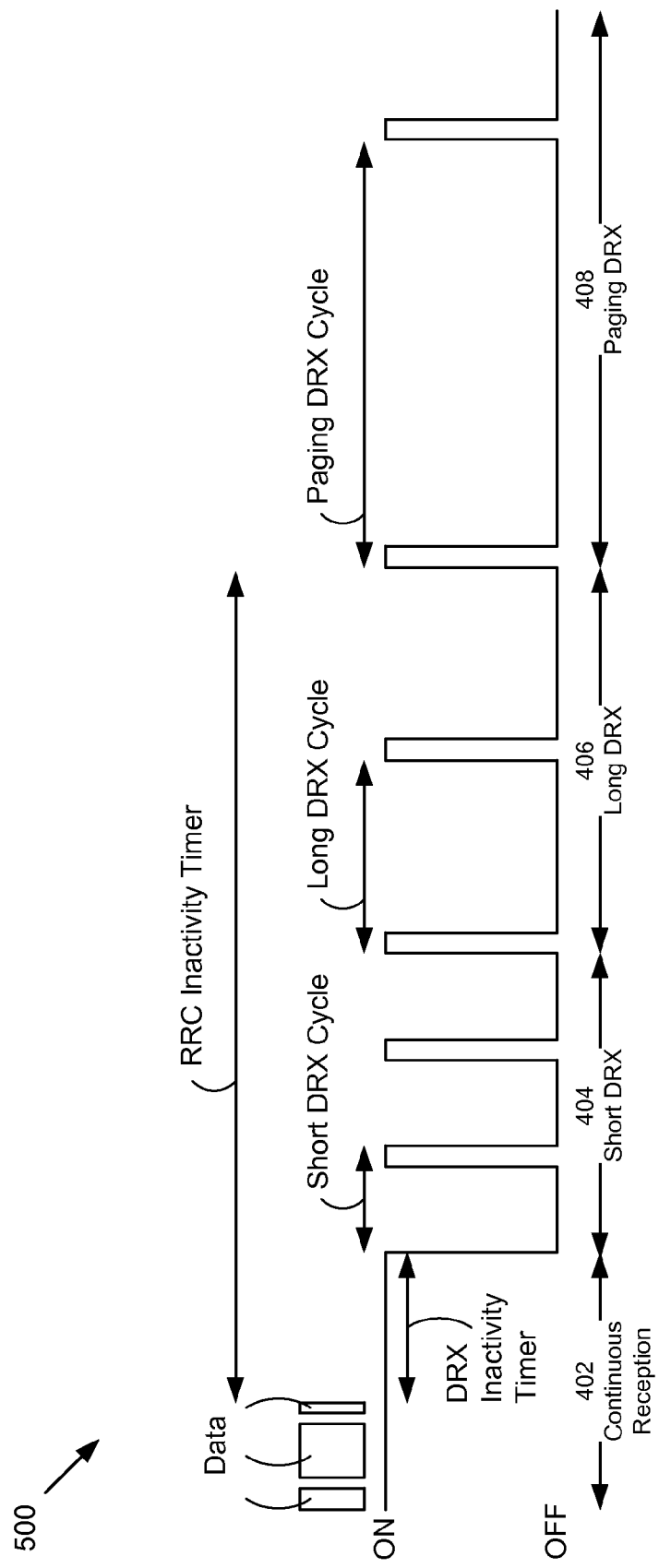
FIG. 5 illustrates discontinuous reception cycles for the sub-states of the RRC connection states of the mobile wireless device illustrated in FIG. 4.

FIG. 5 illustrates a timing diagram 500 in which the mobile wireless device 102 can transition from the continuous reception sub-state 402 (during which data is received and/or transmitted) to the short DRX sub-state 04 after expiration of a DRX inactivity timer. The mobile wireless device 102 can turn off portions of its radio frequency (RF) signal processing hardware in order to conserve battery power. The "ON" label in FIG. 5 can indicate an active transmission or reception period, while the "OFF" label can indicate an inactive period. The mobile wireless device 102 can turn on RF hardware for short periods of time in order to listen for signaling messages from a wireless access network. After a number of short DRX cycles, the mobile wireless device 102 can transition to the long DRX sub-state 406 in which "on" periods are spaced more widely apart than in the short DRX sub-state 404. The wireless access network can include an RRC inactivity timer, which upon expiration can trigger transmission of an RRC connection release message from the wireless access network to the mobile wireless device 102 in order to transition the mobile wireless device 102 from the long DRX sub-state 406 to the paging DRX sub-state 408 of the RRC idle state 304. The "on" listening periods of the paging DRX sub-state 408 can be even more widely spaced apart that in the "short" DRX sub-state 404 or in the "long" DRX sub-state 406 in order to conserve additional battery power while in the paging DRX sub-state 408. In some embodiments, the DRX inactivity timer can exist in the mobile wireless device 102, while the RRC inactivity timer can exist in the wireless access network.

Figure 6:
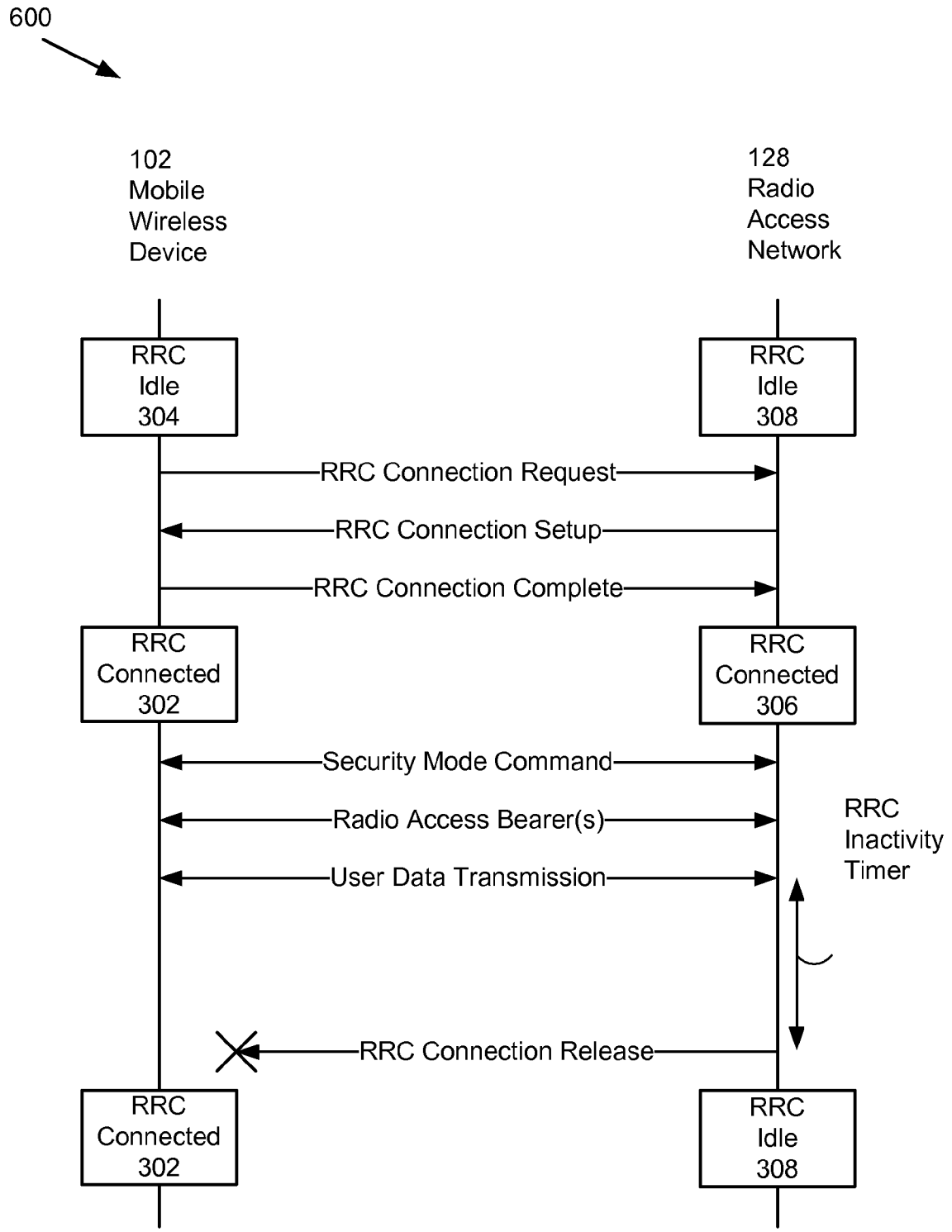
FIG. 6 illustrates a representative message sequence that results in mismatched connection states for a mobile wireless device and a radio access network of a wireless communication network.

FIG. 6 illustrates a message sequence 600 between the mobile wireless device 102 and the radio access network 128 of the wireless network 100 in which the mobile wireless device 102 and the radio access network 128 can end up in misaligned connection states. Initially, the mobile wireless device 102 and the radio access network 128 can be in their respective RRC idle states 304 and 308. The mobile wireless device 102 can send an RRC connection request message to the radio access network 128 in order to request to transition from the RRC idle state 304 to the RRC connected stat 302, e.g., when uplink data is available for transmission at the mobile wireless device 102. The radio access network 128 can respond to the RRC connection request message by sending an RRC connection setup message to the mobile wireless device 102. The mobile wireless device 102, in response to the RRC connection setup message received from the radio access network 128, can send an RRC connection complete message to the radio access network 128 to indicate successful reception of the RRC connection setup message. The mobile wireless device 102 and the radio access network 128 can both transition to their respective RRC connected states 302 and 306. Following an exchange of messages to perform a security mode command procedure, one or more data radio access bearers and one or more signaling radio bearers can be established between the radio access network 128 and the mobile wireless device 102 to transport data messages and signaling messages respectively. Data transmission between the mobile wireless device 102 and the radio access network 128 can proceed. The radio access network 128 can include an RRC inactivity timer, and upon an expiration of the RRC inactivity timer, the radio access network 128 can transmit an RRC connection release message to the mobile wireless device 102 in order to transition the mobile wireless device 128 from the RRC connected state 302 to the RRC idle state 304. FIG. 6 illustrates that the mobile wireless device 102 does not receive and/or cannot decode properly the RRC connection release message transmitted by the radio access network 128. The radio access network 128 can transition from the RRC connected state 306 to the RRC idle state 308 after transmitting the RRC connection release message (and not require an acknowledgement of the RRC connection release message from the mobile wireless device 102.) The mobile wireless device 102, having not received/decoded the RRC connection release message, can remain in the RRC connected state 302, and as a result, the mobile wireless device 102 and the radio access network 128 can end up in misaligned RRC connection states. The mobile wireless device 102 can continue in the RRC connected state 302 for an extended period of time consuming additional battery power, as there is no mechanism by which to transition the mobile wireless device 102 to the RRC idle state 304 in the absence of receiving the RRC connection release message from the radio access network 128.

As described above, the loss of an RRC connection release message from the radio access network 128 to the mobile wireless device 102 can adversely affect the power consumption performance of the mobile wireless device 102. In a representative embodiment, the mobile wireless device 102 can determine whether a set of inactivity trigger conditions monitored locally at the mobile wireless device 102 has been met, and if so, attempt to re-establish the RRC connection to the radio access network 128 or release locally the RRC connected state 302 to return to the RRC idle state 304. In some embodiments, all inactivity trigger conditions in the set of inactivity trigger conditions can be required to be met in order to determine that the set of inactivity trigger conditions is met. In some embodiments, the set of inactivity trigger conditions can include one inactivity trigger condition. In some embodiments, the set of inactivity trigger conditions can include multiple inactivity trigger conditions. The mobile wireless device 102 can include one or more inactivity timers that can measure time intervals between successive data messages (transmitted or received) or between successive signaling messages (transmitted or received). In some embodiments, certain transmitted signaling messages can be excluded from measurements by the inactivity timers, e.g., a signaling inactivity timer can continue to run (and ultimately expire) if only a certain signaling messages or a subset of signaling messages is sent to the wireless access network 128 (and none received from the radio access network 128) by the mobile wireless device 102. In a representative embodiment, signaling messages that include measurement reports transmitted to the radio access network 128 can be excluded from monitoring by the signaling inactivity timer.

Figure 7:
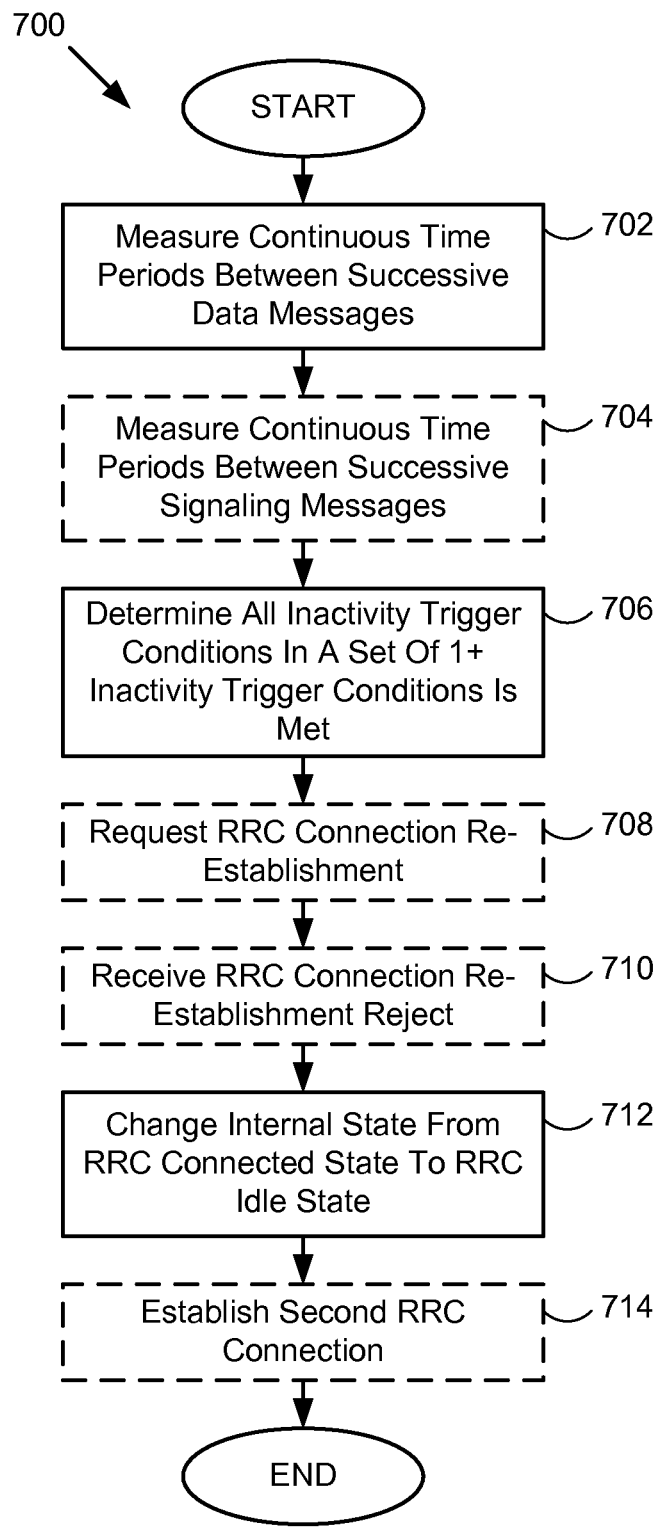
FIG. 7 illustrates a representative embodiment of a method to adjust connection states of a mobile wireless device based on a period of inactivity.

FIG. 7 illustrates a representative method 700 to adjust connection states of a mobile wireless device 102 during a period of data inactivity and/or signaling inactivity at the mobile wireless device 102. In step 702, the mobile wireless device 102 measures continuous time periods between successive data messages transmitted to a wireless access network and/or received from the wireless access network. In optional step 704, the mobile wireless device 102 measures continuous time periods between successive signaling messages transmitted to the wireless access network and/or received from the wireless access network. In some embodiments, select signaling messages transmitted to the wireless access network are excluded form the measurement of the continuous time periods between successive signaling messages. In an embodiment, signaling messages that contain measurement reports are excluded from the measurement of continuous time periods between successive signaling messages. Thus measurement report messages can be transmitted from the mobile wireless device 102 to the wireless access network without restarting a signaling message inactivity timer at the mobile wireless device 102. In step 706, the mobile wireless device 102 determines whether a set of inactivity trigger conditions is met. In some embodiments, the set of inactivity trigger conditions includes expiration of a data inactivity timer, e.g., based on measuring time intervals between successive received and/or transmitted data messages as indicated in step 702. In some embodiments, the set of inactivity trigger conditions includes expiration of a signaling inactivity timer, e.g., based on measuring time intervals between successive received and/or transmitted signaling messages as indicated in step 704. In some embodiments, the set of inactivity trigger conditions includes expiration of the data inactivity timer or the signaling inactivity timer. In some embodiments, the set of inactivity trigger conditions includes expiration of both the data inactivity timer and the signaling inactivity timer. In some embodiments, the mobile wireless device 102 supports one or more discontinuous reception (DRX) mode(s) in an RRC connected state. In some embodiments, the mobile wireless device is not configured for or does not support DRX in the RRC connected state. In some embodiments, a length of time for the data inactivity timer, the signaling inactivity timer, or both can depend on whether the mobile wireless device 102 supports or is configured for a DRX mode in the RRC connected state. In a representative embodiment, the length of time for the inactivity timers is shorter when the DRX mode of the RRC connected state is not supported or configured and longer when the DRX mode of the RRC connected state is supported or configured for the mobile wireless device 102. The DRX mode in the RRC connected state can provide additional power savings over the continuous reception sub-state. Thus, a shorter expiration for the inactivity timer can be desired when the DRX mode is not supported, thus providing for a quicker transition to the RRC idle state from the RRC connected state during prolonged periods of inactivity at the mobile wireless device 102.

When the set of inactivity trigger conditions is met in step 706, the mobile wireless device 102 can perform one or more actions to directly or indirectly reduce power consumption at the mobile wireless device 102. In step 712, the mobile wireless device 102 can transition from an RRC connected state to an RRC idle state. In some embodiments, in step 708, the mobile wireless device 102 can request to re-establish an RRC connection with the wireless access network. If the wireless access network responds to the request to re-establish the RRC connection with an RRC connection reject message received by the mobile wireless device in step 710, the mobile wireless device 102 can conclude that the RRC connection has been released by the wireless access network. The mobile wireless device 102 can then transition from the RRC connected stated to the RRC idle state as indicated by step 712. In a representative embodiment, the mobile wireless device 102 transitions from the RRC connected state to the RRC idle state in step 712 directly after determining that the set of inactivity trigger conditions is met in step 706 (i.e., skipping over optional steps 708 and 710.) In step 714, the mobile wireless device 102 optionally requests to establish a second (new) RRC connection to the wireless access network after releasing the first (initial) RRC connection.

Figure 8:
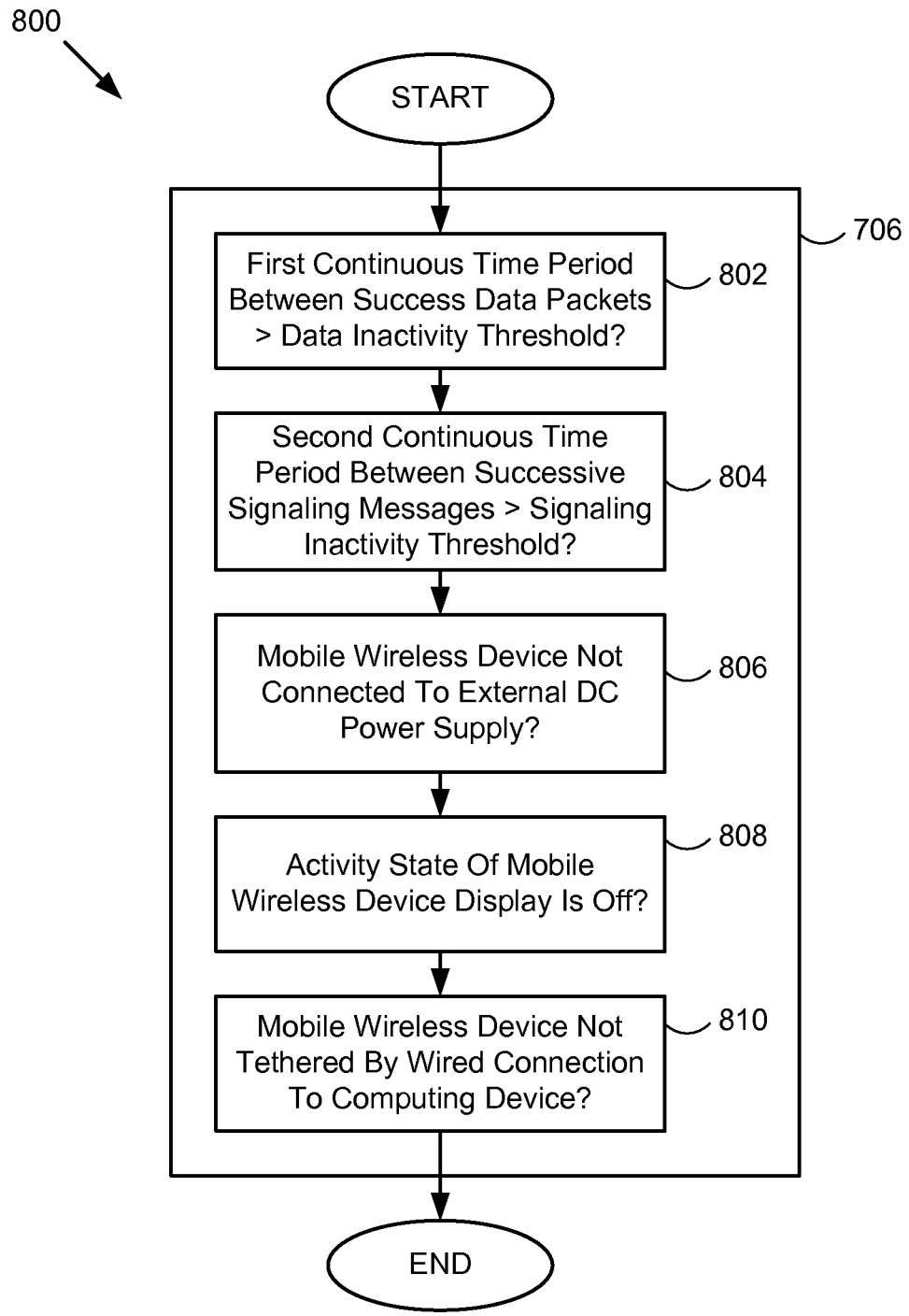
FIG. 8 illustrates representative steps for determining that a set of one or more inactivity trigger conditions is met.

The set of inactivity trigger conditions of step 706 can include one or more test conditions 800 illustrated in FIG. 8. In step 802, the mobile wireless device 102 can determine whether a first continuous time period between successive data messages received or transmitted by the mobile wireless device 102 exceeds a data inactivity threshold. In step 804, the mobile wireless device 102 can determine whether a second continuous time period between successive signaling message received or transmitted by the mobile wireless device 102 exceeds a signaling inactivity threshold. In a representative embodiment, the data inactivity threshold and/or the signaling inactivity threshold depend on whether the mobile wireless device 102 is configured to support discontinuous reception in an RRC connected state. In step 806, the mobile wireless device 102 determines whether it is connected to an external power supply. While powered from an external power supply, the mobile wireless device 102 can elect to remain in the RRC connected state for a longer (or indefinite) inactivity time period rather than transition to the RRC idle state. In step 808, the mobile wireless device 102 can determine whether a display of the mobile wireless device 102 is in an "on" activity state. When the display of the mobile wireless device 102 is "on," the mobile wireless device 102 can choose to remain in the RRC connected state for a longer period of time. In step 810, the mobile wireless device 102 can determine whether a wired tethering connection to a computing device exists. While the mobile wireless device 102 is tethered to another device through a wired connection, e.g., through which power can be supplied to the mobile wireless device 102, the mobile wireless device 102 can remain in the RRC connected state for a longer (or indefinite) period of time before transitioning to the RRC idle state. In a representative embodiment, the mobile wireless device 102 can determine that the set of inactivity triggers is met only when a data inactivity threshold, a signaling inactivity threshold, or both inactivity thresholds are exceeded. In a representative embodiment, the mobile wireless device 102 can also determine that the set of inactivity triggers is met only when the mobile wireless device 102 is not connected to an external power supply, when the display of the mobile wireless device 102 is off, when the mobile wireless device 102 is not tethered to another computing device, or a combination of these conditions is satisfied.

In some embodiments, the mobile wireless device 102 includes a protocol stack that includes one or more layers, the one or more layers including a radio resource control (RRC) layer, a radio link control (RLC) layer, a medium access control (MAC) layer, a network access stratum (NAS) layer, and/or a packet data convergence protocol (PDCP) layer. In a representative embodiment, successive time periods between data messages transmitted or received at the RRC layer of the protocol stack or at the NAS layer of the protocol stack in the mobile wireless device 102 are measured to determine data message inactivity. In a representative embodiment, successive time periods between signaling messages transmitted or received at the MAC layer of the protocol stack, at the RLC layer of the protocol stack, or at the PDCP layer of the protocol stack in the mobile wireless device 102 are measured to determine signaling message inactivity. In a representative embodiment, the mobile wireless device 102 monitors one or more transmit data buffers and/or receive data buffers to determine time periods between successive transmitted and/or received data messages. In a representative embodiment, the mobile wireless device 102 monitors one or more transmit signaling buffers and/or receive signaling buffers to determine time periods between successive transmitted and/or received signaling messages.

Software, hardware, or a combination of hardware and software can implement various aspects of the described embodiments. The described embodiments can also be encoded as computer program code on a non-transitory computer readable medium. The non-transitory computer readable medium is any data storage device that can store data that can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method to adjust radio resource control (RRC) connections states of a mobile wireless device in communication with a wireless access network using a Long Term Evolution (LTE) or Long Term Evolution Advanced (LTE-A) wireless communication protocol, the method comprising:
   at the mobile wireless device, while in an RRC connected state:
      measuring continuous time periods between successive data messages and between successive signaling messages transmitted to or received from the wireless access network;
      determining that one or more sets of inactivity trigger conditions are met, wherein (i) a first set of inactivity trigger conditions comprises a first continuous time period between the successive data messages exceeds a data inactivity threshold without receiving an RRC connection release signaling message from the wireless access network during the first continuous time period, and (ii) a second set of inactivity trigger conditions comprises a second continuous time period between successive signaling messages exceeds a signaling inactivity threshold without receiving the RRC connection release signaling message from the wireless access network during the second continuous time period, wherein the first continuous time period and the second continuous time period do not overlap;
      when the one or more sets of inactivity trigger conditions comprise only the first set of inactivity trigger conditions and when the first set of inactivity trigger conditions is met, changing an internal state of the mobile wireless device from the RRC connected state to an RRC idle state; and
      when the one or more sets of inactivity trigger conditions comprise both the first set of inactivity trigger conditions and the second set of inactivity trigger conditions:
         (i) when the first set of inactivity trigger conditions and the second set of inactivity trigger conditions are met, changing the internal state of the mobile wireless device from the RRC connected state to the RRC idle state, and
         (ii) when the first set of inactivity trigger conditions is met and the second set of inactivity trigger conditions is not met, continuing in the RRC connected state.

2. The method recited in claim 1, wherein measuring continuous time periods between the successive signaling messages excludes measurement report signaling messages transmitted by the mobile wireless device to the wireless access network.

3. The method recited in claim 2, wherein the data inactivity threshold, the signaling inactivity threshold, or both inactivity thresholds are based at least in part on whether the mobile wireless device is configured to support a discontinuous reception mode while in the RRC connected state.

4. The method recited in claim 2, further comprising:
   transmitting a signaling message to the wireless access network, the signaling message comprising a request to establish a new RRC connection between the mobile wireless device and the wireless access network, after changing the internal state of the mobile wireless device from the RRC connected state to the RRC idle state.

5. The method recited in claim 2, further comprising:
   transmitting a signaling message to the wireless access network, the signaling message comprising a request to re-establish an existing RRC connection with the wireless access network, before changing the internal state of the mobile wireless device from the RRC connected state to the RRC idle state; and in response to receiving an RRC re-establishment reject message from the wireless access network, changing the internal state of the mobile wireless device from the RRC connected state to the RRC idle state.

6. The method recited in claim 2, further comprising:

monitoring a battery power state of the mobile wireless device, and wherein the one or more sets of inactivity trigger conditions further comprise the battery power state indicating that the mobile wireless device is not connected to an external power supply, wherein when an inactivity trigger condition based on the battery power state is met and at least one other inactivity trigger condition is met, changing the internal state of the mobile wireless device from the RRC connected state to the RRC idle state.

7. The method recited in claim 2, further comprising:

monitoring an activity state of a display of the mobile wireless device; and wherein the one or more sets of inactivity trigger conditions further comprise the activity state of the display of the mobile wireless device is off, wherein when an inactivity trigger condition based on the activity state of the display is met and at least one other inactivity trigger condition is met, changing the internal state of the mobile wireless device from the RRC connected state to the RRC idle state.

8. The method recited in claim 2, further comprising:

monitoring a tethering state of the mobile wireless device; and wherein the one or more sets of inactivity trigger conditions further comprise the mobile wireless device is not tethered by a wired connection to a computing device, wherein when an inactivity trigger condition based on a state of tethering of the mobile device is met and at least one other inactivity trigger condition is met, changing the internal state of the mobile wireless device from the RRC connected state to the RRC idle state.

9. The method recited in claim 2, wherein the signaling messages are transmitted or received at an RRC layer of a protocol stack or at a network access stratum (NAS) layer of the protocol stack in the mobile wireless device.

10. The method recited in claim 1, wherein the data messages are transmitted or received at a medium access control (MAC) layer of a protocol stack, at a radio link control (RLC) layer of the protocol stack, or at a packet data convergence protocol (PDCP) layer of the protocol stack in the mobile wireless device.

11. A mobile wireless device comprising:

one or more processors configured to control establishing and releasing radio resource control (RRC) connections between the mobile wireless device and a wireless access network;

a transmitter configured to transmit signals to the wireless access network according to a Long Term Evolution (LTE) or Long Term Evolution Advanced (LTE-A) wireless communication protocol; and one or more receivers configured to receive signals from the wireless access network according to the LTE or LTE-A wireless communication protocol;

wherein the one or more processors are further configured to:

measure continuous time periods between successive data messages and between successive signaling messages transmitted to or received from the wireless access network;

determine that one or more sets of inactivity trigger conditions are met, wherein (i) a first set of inactivity trigger conditions comprises a first continuous time period between the successive data messages exceeds a data inactivity threshold without receiving an RRC connection release signaling message from the wireless access network during the first continuous time period, and (ii) a second set of inactivity trigger conditions comprises a second continuous time period between successive signaling messages exceeds a signaling inactivity threshold without receiving the RRC connection release signaling message from the wireless access network during the second continuous time period, wherein the first continuous time period and the second continuous time period do not overlap;

when the one or more sets of inactivity trigger conditions comprise only the first set of inactivity trigger conditions and when the first set of inactivity trigger conditions is met, chance an internal state of the mobile wireless device from a RRC connected state to an RRC idle state; and when the one or more sets of inactivity trigger conditions comprise both the first set of inactivity trigger conditions and the second set of inactivity trigger conditions:

(i) when the first set of inactivity trigger conditions and the second set of inactivity trigger conditions are met, chance the internal state of the mobile wireless device from the RRC connected state to the RRC idle state, and (ii) when the first set of inactivity trigger conditions is met and the second set of inactivity trigger conditions is not met, continue in the RRC connected state.

12. The mobile wireless device recited in claim 11, wherein measure continuous time periods between the successive signaling messages excludes measurement report signaling messages transmitted by the mobile wireless device to the wireless access network.

13. The mobile wireless device recited in claim 12, wherein the data inactivity threshold, the signaling inactivity threshold, or both inactivity thresholds are based at least in part on whether the mobile wireless device is configured to support a discontinuous reception mode while in the RRC connected state.

14. The mobile wireless device recited in claim 12, wherein the one or more processors are further configured to:

transmit a signaling message to the wireless access network, the signaling message comprising a request to establish a new RRC connection with the wireless access network, after the mobile wireless device transitions from the RRC connected state to the RRC idle state.

15. The mobile wireless device recited in claim 12, wherein the one or more processors are further configured to:

transmit a signaling message to the wireless access network, the signaling message comprising a request to re-establish an existing RRC connection with the wireless access network, before the mobile wireless device transitions from the RRC connected state to the RRC idle state; and transition the mobile wireless device from the RRC connected state to the RRC idle state in response to receiving an RRC re-establishment reject message from the wireless access network.

16. The mobile wireless device recited in claim 12, wherein the one or more processors are further configured to:
   monitor a battery power state of the mobile wireless device; and
   wherein the one or more sets of inactivity trigger conditions further comprise the battery power state indicating that the mobile wireless device is not connected to an external power supply,
   wherein when an inactivity trigger condition based on the battery power state is met and at least one other inactivity trigger condition is met, change the internal state of the mobile wireless device from the RRC connected state to the RRC idle state.

17. The mobile wireless device recited in claim 12, wherein the one or more processors are further configured to:
   monitor an activity state of a display of the mobile wireless device; and
   wherein the one or more sets of inactivity trigger conditions further comprise the activity state of the display of the mobile wireless device is off,
   wherein when an inactivity trigger condition based on the activity state of the display is met and at least one other inactivity trigger condition is met, change the internal state of the mobile wireless device from the RRC connected state to the RRC idle state.

18. The mobile wireless device recited in claim 12, wherein the one or more processors are further configured to:
   monitor a tethering state of the mobile wireless device; and
   wherein the one or more sets of inactivity trigger conditions further comprises the mobile wireless device is not tethered by a wired connection to a computing device,
   wherein when an inactivity trigger condition based on a state of tethering of the mobile device is met and at least one other inactivity trigger condition is met, change the internal state of the mobile wireless device from the RRC connected state to the RRC idle state.

19. A computer program product encoded as computer program code in a non-transitory computer readable medium for adjusting radio resource control (RRC) connections states at a mobile wireless device in communication with a wireless access network, the computer program product comprising:
   computer program code for measuring continuous time periods between successive data messages and between successive signaling messages transmitted to or received from the wireless access network
   computer program code for determining that one or more sets of inactivity trigger conditions are met, wherein (i) a first set of inactivity trigger conditions comprises a first continuous time period between the successive data messages exceeds a data inactivity threshold without receiving an RRC connection release signaling message from the wireless access network during the first continuous time period, and (ii) a second set of inactivity trigger conditions comprises a second continuous time period between successive signaling messages exceeds a signaling inactivity threshold without receiving the RRC connection release signaling message from the wireless access network during the second continuous time period, wherein the first continuous time period and the second continuous time period do not overlap; and
   computer program code for determining whether to transition the mobile wireless device from an RRC connected state to an RRC idle state:
      when the one or more sets of inactivity trigger conditions comprise only the first set of inactivity trigger conditions and when the first set of inactivity trigger conditions is met, changing an internal state of the mobile wireless device from the RRC connected state to the RRC idle state; and
      when the one or more sets of inactivity trigger conditions comprise both the first set of inactivity trigger conditions and the second set of inactivity trigger conditions:
         (i) when the first set of inactivity trigger conditions and the second set of inactivity trigger conditions are met, changing the internal state of the mobile wireless device from the RRC connected state to the RRC idle state, and
         (ii) when the first set of inactivity trigger conditions is met and the second set of inactivity trigger conditions is not met, continuing in the RRC connected state.

* * * * *